Nov. 3, 1942.  E. T. DAVIS  2,300,537
CONTROL SYSTEM
Filed June 3, 1940  5 Sheets-Sheet 1

Inventor
Elwood T. Davis
By Cornelius D. Ehret
Attorney.

Nov. 3, 1942.  E. T. DAVIS  2,300,537
CONTROL SYSTEM
Filed June 3, 1940  5 Sheets-Sheet 2

Inventor
Elwood T. Davis
Cornelius D. Ehret
By Attorney.

Nov. 3, 1942.    E. T. DAVIS    2,300,537
CONTROL SYSTEM
Filed June 3, 1940    5 Sheets-Sheet 5

Inventor
Elwood T. Davis
By Cornelius D. Ehret
Attorney.

Patented Nov. 3, 1942

2,300,537

UNITED STATES PATENT OFFICE 2,300,537

CONTROL SYSTEM

Elwood T. Davis, Brookline, Pa., assignor to Leeds & Northrup Company, Philadelphia, Pa., a corporation of Pennsylvania Application June 3, 1940, Serial No. 338,466

25 Claims. (Cl. 236—78)

My invention relates to system varying the application of an agent to control the magnitude of a condition, such as temperature, ion concentration, pressure, or other physical, chemical or electrical condition.

In accordance with one aspect of my invention, the operation of a control member, such as a valve, rheostat, or the like, regulating the application of an agent affecting the magnitude of a condition, is controlled by a contact-galvanometer, or equivalent circuit-controlling means, responsive to unbalance of an electrical network which includes a variable impedance whose adjustable element is displaced from a control point in accordance with or in response to deviation from the desired magnitude of aforesaid condition, and which aforesaid control member is also controlled by one or more other circuit-controlling devices whose circuit-controlling positions or actions depend upon displacement of said adjustable element from the control point.

More particularly, and in some forms of my invention, at least one of the impedances, more particularly resistors, of the balanceable network has a substantial temperature coefficient and is disposed in heat transfer relation with a heating coil controlled by one or more of said circuit-controlling devices slowly to affect or shift the balance point of the network; in preferred modifications of my invention, having several impedances of the network so varied in magnitudes by association with individual heating coils, the heating coils are selectively energized, whereas in other modifications the heating coils are concurrently energized but produce different rates of change of resistance of their associated resistors.

My invention further resides in the systems hereinafter described and claimed.

For an understanding of my invention and for illustration of various forms thereof, reference is to be had to the accompanying drawings, in which.

Figures 1, 2:
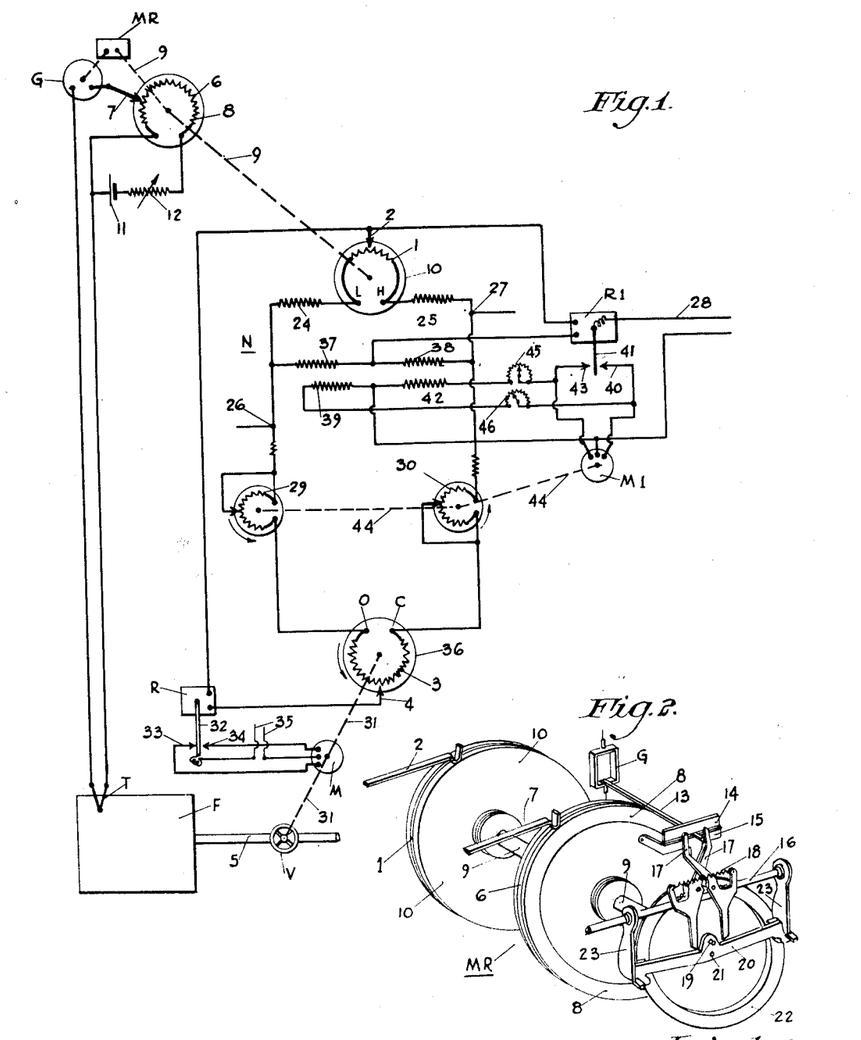
Fig. 1 diagrammatically illustrates an electrical control system for regulating the temperature of a furnace.
Fig. 2, in perspective, shows mechanical relay mechanism utilizable in the system of Fig. 1 and in all other systems herein illustrated.

Referring to Fig. 1, the network N comprises a slidewire 1 whose position with respect to its contact 2 corresponds with the existing magnitude of the condition to be controlled and a slidewire 3 whose position with respect to its contact 4 corresponds with the setting of a control element, for example valve V, adjustable to vary the application of an agent which affects the magnitude of the condition.

For purpose of illustration, the control circuit including network N is shown as utilized to control the temperature of a furnace F having aforesaid valve V in fuel line 5.

Any suitable temperature-responsive device may be utilized to position contact 2 with respect to slidewire 1 in accordance with the temperature of the furnace F. I prefer the self-balancing potentiometer arrangement shown in Fig. 1 in which the voltage produced by thermocouple T, suitably disposed to respond to the furnace temperature, is automatically balanced against the effective voltage of potentiometer slidewire 6. Upon change in furnace temperature, the galvanometer G deflects to effect, through mechanical relay mechanism MR, adjustment of the potentiometer slidewire 6, with respect to its contact 7, in such sense and to such extent the thermocouple voltage is again balanced. The disc 8 upon which the potentiometer slidewire 6 is mounted is coupled, as by shaft 9, to the disc 10 upon which the slidewire 1 of network N is mounted, so that each different position of contact 2 with respect to slidewire 1 corresponds with a different temperature of furnace F. In this modification, and all others herein disclosed, most or all of the resistance of slidewire 1 is preferably, though not necessarily, concentrated in its central section of limited angular extent, for example, 60 degrees.

The current for the potentiometer slidewire 6, derived from any suitable source, such as a battery 11, is, from time to time, adjusted, as by variation of rheostat 12, to maintain it at standard value for which the slidewire 6 is calibrated. The usual standard cell and switching arrangement for effecting the standardization is not shown.

The mechanical relay mechanism MR, diagrammatically shown in Fig. 2, may be of the type fully described and claimed in Squibb Patent No. 1,935,732. In brief, the pointer 13 of the galvanometer is intermittently clamped against the stationary stop 14 by the clamping member 15 which is periodically rocked by a cam, not shown, on the shaft 16 continuously rotated at suitable speed, for example, thirty revolutions per minute. While the needle is so clamped, the feelers 17, 17 are released, by a cam (not shown) on shaft 16, for movement toward each other by their biasing spring 18. If the pointer is clamped to the right or left of its neutral or central position, the lower end of one or the other of the feelers 17, during its movement, engages the pin 19 extending from the driving clutch member 20 and swings it about its pivot 21 in a sense and to extent corresponding with the sense and extent of deflection of the pointer 13 from its neutral position. While so displaced from its neutral position, the driving clutch member 20 is moved, under the control of a cam (not shown) on shaft 16, into engagement with the driven clutch member 22 attached to aforesaid shaft 9. Within the same revolution of shaft 16, one or the other of the cams 23 engages driving clutch member 20 and returns it to the neutral position shown in Fig. 2, and since, during this time, the clutch members 20 and 22 are in engagement with each other, each of the slidewire discs 8 and 10 is moved in a direction and to an extent corresponding with the deflection of the galvanometer pointer.

For purpose of explanation, it is assumed that when the temperature of furnace F is at the desired magnitude, the contact 2 is in engagement with the midpoint of slidewire 1 and that slidewire disc 10 is moved in clockwise direction as the temperature falls, and in counterclockwise direction as the temperature rises. For brevity, that relative position of slidewire 1 and contact 2 which corresponds with the desired temperature is termed the control point.

The end coils or resistances 24, 25, connected between the terminals of the slidewire 1 and the terminals 26, 27 of network N, determine the limits between which the ratio of the impedances of the two upper arms of the bridge is varied by adjustment of slidewire 1 with respect to contact 2. The terminals 26, 27 of network N are connected to any suitable source of direct or alternating current. They may, for example as in Fig. 4, be connected to the secondary terminals of a transformer whose primary is energized from the alternating current line 28.

The lower pair of arms of the network N, Fig. 1, includes the adjustable resistances 29 and 30 connected between terminals of the slidewire 3 and aforesaid supply terminals 26, 27 of the network.

The reversible motor M, of any suitable type, is suitably connected through shafting and gearing, generically illustrated by broken line 31, to the fuel valve V and is controlled by a reversing switch comprising contacts 32, 33 and 34 operated in response to unbalance of the network N by the relay R of any suitable type, for example, a contact galvanometer. The motor M is energized from any suitable source of current connected to the terminals 35, 35 of its control circuit. The motor M also is mechanically coupled to the supporting disc 36 of the slidewire 3 to effect, upon unbalance of network N, adjustment of slidewire 3 with respect to its contact 4 in that sense required to restore the network N to balance.

It is characteristic of the control system thus far described that, upon change of furnace temperature, the network N is unbalanced by movement of slidewire 1 to an extent corresponding with the extent of the temperature change and is rebalanced by adjustment of slidewire 3 concurrently with actuation of valve V by motor M. Accordingly, for every furnace temperature there is a corresponding position or setting of valve V.

When the relations between the extents of valve adjustment and the extents of adjustment of slidewires 1 and 3 are so selected that the system is stable, the temperature-load characteristic of the system is a drooping one; that is, the control system tends to maintain the furnace temperature constant at a magnitude which becomes less and less with increasing heat demand upon the furnace. Unless such relations producing a drooping characteristic are selected, the control system is unstable.

To maintain the temperature substantially constant at desired magnitude independent of fluctuations of furnace load, the network N is provided with another pair of arms comprising, or consisting of, the resistors 37, 38 of material, such as nickel, having a substantial temperature coefficient of resistance. The energization of heater coil 39, which is in intimate heat transfer relation with resistor 37, is controlled by contacts 40, 41 of relay R1 responsive to unbalance of a second or subsidiary bridge whose arms comprise resistances 37, 38, 24, resistance 25 and slidewire 1. Energization of the heater 42, which is in intimate heat transfer relation with resistor 38, is controlled by the contacts 43, 41 of relay R1.

Energization and reversal of the reversible motor M1, which is mechanically coupled, as generically indicated by broken line 44, to the resistances 29 and 30 of the main bridge of network N, is controlled by aforesaid contacts 40, 41, 43 of relay R1.

The magnitudes of resistance of resistors 37, 38 are so chosen that when the slidewire 1 is in the position corresponding with the desired temperature, the subsidiary bridge or network is in balance. Assuming, for example, the temperature has fallen from the desired magnitude so to reduce the impedance between terminal 26 and contact 2 of the network and concurrently to increase the impedance between the contact 2 and terminal 27 of the network, the relay R1 responds to the unbalance to energize the heater coil 42, gradually to increase the resistance of resistor 38 and so tend slowly to restore balance of the subsidiary network with contact 2 and slidewire 1 relatively displaced from the control point. Until such balance is restored, the contacts 41 and 43 of relay R1 remain closed to effect energization of motor M1 for adjustment of resistances 29 and 30 in that sense unbalancing or tending to unbalance the main network N which causes, through relay R, energization of motor M in that sense effecting further opening of the fuel valve V. This secondary control action, due to adjustment of resistors 29, 30, or equivalent, is distinct from and in addition to the primary control action due to movement of slidewire 1 in response to change of temperature.

When the resistance of 38, because of the heat received from coil 42, has attained that value which effects rebalance of the subsidiary network, the relay R1 breaks the circuit to the heating coil 42 and to the motor M1, whereupon resistance 38 begins to cool with consequent decrease of its resistance.

If the temperature of the furnace is rising toward the desired magnitude thereof at the same rate that resistance 38 is cooling, the auxiliary network remains in balance and there is no further adjustment of the droop-correcting resistors 29 and 30 by motor M1.

If the temperature is rising toward the desired magnitude thereof at a rate slower than the rate at which resistance 38 is cooling, the auxiliary network is again unbalanced in the same sense as before and relay R1 effects closure of contacts 41 and 43 again to energize the heater coil 42 and the motor M1 to effect further adjustment of the impedances 29 and 30; however, because the slidewire 1 has moved toward the control point, coil 42 is energized for a shorter time than before to effect rebalance. The cyclic heating and cooling of resistor 38 continues, with increasingly shorter periods of energization of heater 42 and motor M1 until the slidewire returns to the control point.

If, on the contrary, the furnace temperature is increasing more rapidly than the rate at which resistor 38 is cooling, the auxiliary network is unbalanced in opposite sense and relay R1 responds to effect energization of the heater coil 39 slowly to increase the effective magnitude of resistance 37 and also, by closure of its contacts 40 and 41, to effect reverse adjustment of the resistances 29 and 30 by reverse operation of the motor M1. When the effective magnitude of resistance 37 has, because of heat received from heater 39, attained that value sufficient to rebalance the subsidiary network, relay R1 responds to deenergize heater 39 and motor M1 whereupon resistance 37 begins to cool.

From the foregoing, it will be understood that when the temperature increases above the desired magnitude, there is at once effected a primary adjustment corresponding with or proportional to the deviation of slidewire 1 from the control point and that there is subsequently, or more slowly, effected secondary adjustments of the valve V due to the cyclic balancing and unbalancing of the subsidiary network continuing until slidewire 1 returns to the control point.

In short, the subsidiary network including the resistors 37, 38, and their associated heating coils 39 and 42, prevents the main network N from remaining permanently in balance so long as the slidewire disc 10 is away from the position corresponding with the desired temperature; so long as any deviation from the desired temperature exists, the subsidiary network is cyclically unbalanced to effect adjustment of the impedances 29 and 30 of the main network, in that sense providing for return of the furnace temperature to the desired magnitude and at a rate which progressively decreases as the desired temperature is approached, thus to avoid overshooting or hunting.

The rheostats 45, 46 in series with the heater coils 42 and 39 may be provided to provide for adjustment of the rate at which droop-corrective action is effected. Increase in magnitude of the series resistances 45, 46 requires the contacts of relay R1 to be closed for a longer time to procure a given increase in temperature of the resistors 37 and 48 and consequently motor M1 runs for a longer interval before a balance of the subsidiary network is effected. Rheostats 45, 46 may be mounted on the same shaft or on separate shafts, depending upon whether symmetrical or unsymmetrical response is desired.

The resistor 37 and its heater 39 may be wound upon a common form, for example a tube of copper or other metal affording the desired rate of increase of resistance of resistor 37; resistor 38 and its heater coil 42 may comprise a similarly constructed unit or assembly having the same, or a different, rate of resistance rise. The rate of change of temperature of each of resistances 37, 38 may conveniently be varied by filling its metal form to greater or lesser extent with metal blocks or washers.

By suitable design of these assemblies to provide appreciable heat capacity, the droop-corrective action takes into account the rate of change in the furnace temperature. Upon decrease of temperature, for example from the control point, the heater coil 42 not only has to supply enough heat to take care of losses by radiation from the assembly, but also to supply its heat storage capacity. Conversely, during cooling of resistor 38, the opposite effect takes place since the heat stored in the form supplies the radiation losses and so causes the resistance of resistor 38 to change more slowly than otherwise. Therefore, by proper selection of the heat storage capacities of the assemblies 37, 39 and 38, 42, the droop correction may be made to proceed more quickly when the temperature is departing from the control point than when it is returning toward the control point.

Figure 3:
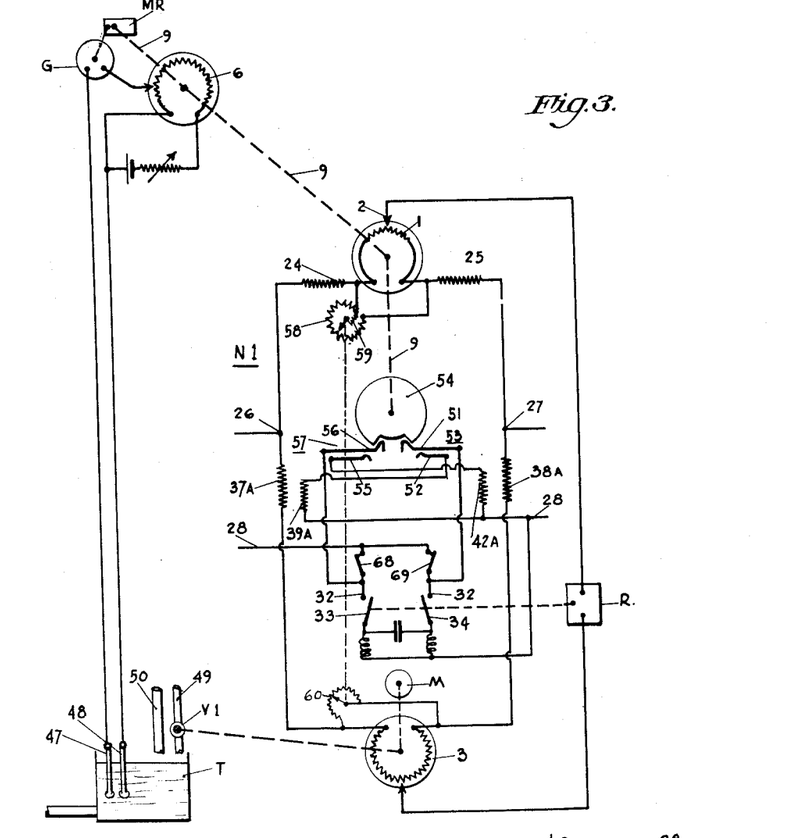
Fig. 3 diagrammatically illustrates a modification of the control system of Fig. 1 utilized for regulation or control of the ion concentration of a solution.

In the control system shown in Fig. 3, those elements having the same purpose as elements shown in Fig. 1 are identified by the same reference characters. By way of illustration, the control system of Fig. 3 is shown as utilized to control the ion concentration of a solution within tank T, although it is to be understood this system, as well as all others herein disclosed, may be utilized to control temperature, pressure, or any other physical, electrical or chemical condition.

In the particular arrangement shown in Fig. 3, the ion concentration is measured by a cell comprising the electrodes 47, 48 of any suitable type. One of them may, for example, be a saturated calomel half cell, and the other may be an antimony electrode, a glass electrode, or any other suitable measuring electrode. The potential difference of the electrodes is balanced against that of potentiometer slidewire 6 by galvanometer G and mechanical relay mechanism MR. Accordingly, the position of slidewire 1 with respect to contact 2 corresponds with the ion concentration of the solution.

In response to unbalance of the network N1 comprising slidewires 1 and 3, the relay R by its actuation of the reversing switch comprising contacts 32, 33, 34, effects rotation of motor M in that direction required to effect rebalancing adjustment of slidewire 3 and concurrently adjusts the valve V1 to vary the rate of supply of reagent to the tank T in proper sense to obtain the desired ion concentration. The solution in tank T may, for example, comprise a mixture of lime supplied through the pipe 49 and of cane juice supplied to the tank through pipe or duct 50.

To eliminate the drooping characteristic of the primary control action occurring upon unbalance of the bridge N1 due to change in setting of slidewire 1, there are provided the resistors 37A, 38A connected between the terminals of the slidewire 3 and the supply terminals 26, 27 of the network N1. These resistors, like resistors 37, 38 of Fig. 1, are of nickel or other metal having suitable temperature coefficient of resistance and each is in intimate heat transfer relation with a heater coil selectively energized in accordance with the sense of deviation of the ion concentration from the desired magnitude. The heater 39A, preferably wound on the same form as resistance 37A, and in any event in intimate heat transfer relation thereto, is in series with the contacts 51, 52 of a switch 53 which is closed by control disc 54 on shaft 9 when the ion concentration is slightly lower than desired and remains closed for all lower concentrations. The heater coil 42A, preferably wound on the same form as resistance 38, is in series with the contacts 55, 56 of a switch 57 which is closed so long as the ion concentration is higher than slightly above the desired magnitude.

Assuming, for example, the ion concentration falls from the desired control point, the relay R at once effects closure of those contacts of switch 32, 33, 34 which cause the motor M to rotate in proper direction further to open valve VI and to adjust slidewire 3 in counterclockwise direction until balance of the network NI is restored. This proportional control action is not itself sufficient to insure return of the ion concentration to the desired magnitude. However, concurrently with departure of slidewire I from the control point, disc 54 on shaft 9 closes the switch 53 to energize the heater coil 39A and so cause slow increase in the temperature and resistance of resistor 37A. This change in magnitude of resistance 37A unbalances the network NI in sense causing a further opening of the valve VI. Each time network NI is sufficiently unbalanced to cause response of relay R, motor M is energized to effect rebalancing adjustment of slidewire 3 and further opening of valve VI.

When the increase in valve opening is sufficient to cause the ion concentration to return to the control point, the switch 53 is opened to deenergize the heater coil 39A, whereupon the temperature and resistance of resistor 37A slowly decreases to cause unbalance of the network NI in reverse direction and slow movement of the valve back toward its midposition. If the reagent demand is such that the valve VI must be open more than half way, for example, to hold the ion concentration at the desired magnitude, the ion concentration again will fall and so effect reclosure of switch 53. This will reverse the droop corrector action again to cause the valve VI to open.

Conversely, when the ion concentration increases more than slightly above the control point, the disc 54 effects closure of switch 57 to energize heater 42A and so cause a slow increase of the resistance of resistor 38A with a consequent succession of unbalancing and rebalancing actions corresponding with a series of closing adjustments of valve VI by motor M. When the valve opening is sufficiently decreased to have caused return of the ion concentration nearly to the desired magnitude, switch 57 is opened, whereupon the heater 42A is deenergized and resistor 38A slowly cools so to cause gradual opening of the valve.

In brief, the control action is one which causes the disc 54 slowly to oscillate about the setting of switch 53 when the reagent demand is heavy, and about the setting of switch 57 when the reagent demand is light.

The primary control effect, or extent to which the bridge is unbalanced by adjustment of slidewire I, may be varied by changing the setting of the rheostat 58 which is connected in shunt to the slidewire I in series with a limiting resistance 59. The limits between which the ratio of the impedances of the lower arms of the bridge can be varied is determinable by the setting of the rheostat 60 connected in shunt to the slidewire 3. The adjustable elements of resistances 58, 60 may be mechanically coupled for simultaneous adjustments of the resistances in reverse sense—this same arrangement for adjustment of the throttling range may be utilized in the system of Fig. 1.

Unlike the system shown in Fig. 1, the system shown in Fig. 3 has a single rate of droop correction.

Figure 3A:
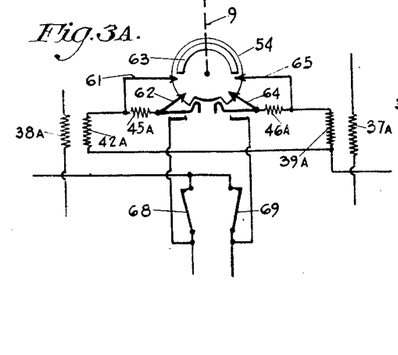
Figs. 3A and 3B are fragmentary views of modifications or portions of the system of Fig. 3.

The modification of Fig. 3, shown in Fig. 3A, provides for high and low rate of droop correction. The resistance 45A in series with the heater coil 42A is connected to contacts 61, 62 which are bridged by contact 64 on disc 54 when the ion concentration is substantially above the control point, to effect more rapid change in temperature and resistance of resistor 38A. For smaller deviations of ion concentration above the control point, the series resistance 45A is effective, because contacts 61, 62 are not so bridged, to reduce the current in the heater coil and, therefore, to reduce the rate at which the temperature of coil 38A is increased. Similarly, the resistance 46A and contacts 63, 64 and 65 provide for two rates of heating and change of resistance of the resistor 37A.

When the ion concentration is low but not substantially so, the resistor 46A is effective to reduce the current in the heating coil 39 and so cause slow change in temperature and resistance of resistor 37A; but when the ion concentration is substantially lower, the contacts 64, 65 are bridged by contact 63 on disc 54 so effectively to eliminate the series resistance 46A and cause high rate of heating of resistance 37A.

Figure 3B:
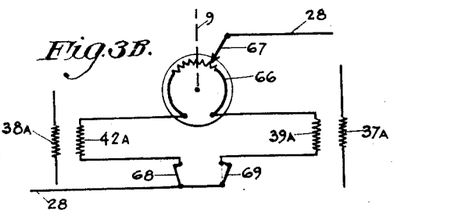

By recourse to the modification shown in Fig. 3B, the system of Fig. 3, like that of Fig. 1, may have any selected one of an infinite number of rates of droop correction. In this modification, the heater coils 42A and 39A are connected to opposite terminals of an additional slidewire 66 attached to shaft 9 and having a contact 67 connected to one of the line conductors 28. With this arrangement, both heaters are continuously energized, but the ratio of the currents traversing them depends upon the sense and extent of the deviation of slidewire I from the control point. This arrangement eliminates the slow, low-amplitude hunting or oscillation above described as characteristic of the system shown in Fig. 3. The angular extent of the slidewire 66 should be suitably narrow to minimize the droop of the load characteristic.

In the modifications shown in Figs. 3, 3A and 3B the switches 68 and 69 are normally closed limit switches selectively opened when the valve VI, or equivalent control element, reaches the upper or lower limit of its range of adjustment.

Figure 4:
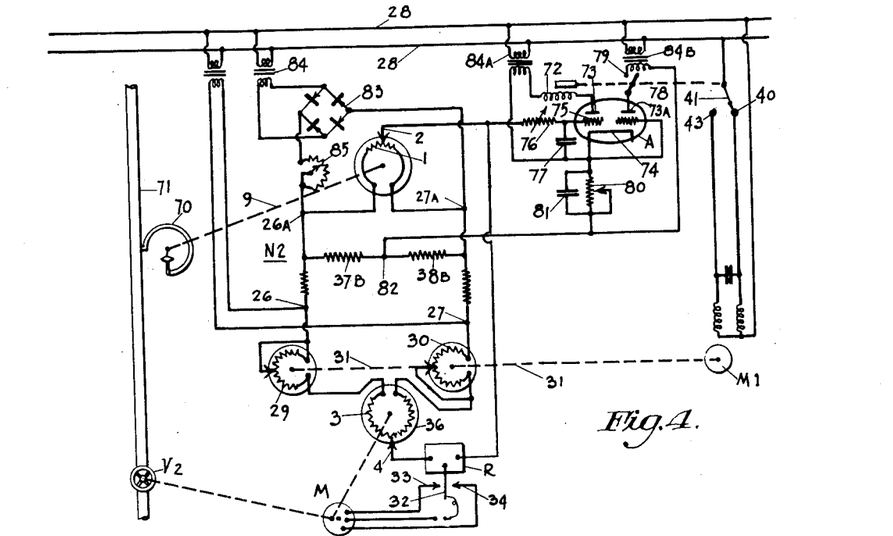
Fig. 4 is a modification of the control system of Fig. 1 utilized for controlling pressure.

In the modification of my invention shown in Fig. 4, slidewire I, for purpose of illustration, is shown mechanically connected to Bourdon tube 70 responsive to changes in pressure within the pipe or duct 71. As in the systems of Figs. 1 and 3, unbalance of the network comprising the slidewire I and slidewire 3 effects response of relay R to control a reversible motor M which effects a rebalancing adjustment of slidewire 3 and concurrent change in setting of a valve or equivalent agent-controlling element. Valve V2, Fig. 4, controls the rate of flow of fluid through pipe 71.

The resistors 37B and 38B have such magnitudes of resistance that the subsidiary network comprising them and slidewire 1 is in balance when slidewire 1 is in the position corresponding with desired pressure.

To effect control of motor M1 coupled to the adjustable elements of droop-correcting resistors 29 and 30 of the main network, there is provided the auxiliary apparatus now described which, in general, has the same function as the relay R1 and the heater coils 39 and 42 of Fig. 1. The coil of relay 72 is in circuit between the anode 73 and the cathode 74 of a thermionic tube A for energization from any suitable source of current, for example, the transformer 84A. The interelectrode resistance betwen anode 73 and cathode 74 is controlled by grid 75 connected through resistance 76 to the contact 2 of slidewire 1 and through condenser 77 to aforesaid cathode 74 of the tube. Movable contact 78 of relay 72 is adapted to engage stationary contact 79 to complete a circuit including the inter-electrode resistance between anode 79 and cathode 74, the rheostat 80 which is preferably shunted by a condenser 81, and a suitable source of current, for example, transformer 84B. The more negative end of rheostat 80 is connected to point 82 between resistances 37B and 38B of the subsidiary network.

When the relay 72 is deenergized, contact 78 is open and no current flows through resistance 80. Condenser 77, previously charged as hereinafter described, thereupon begins to discharge through the path including resistance 76, slidewire 1, and resistances 37B, 38B and 80. Since the magnitude of resistance 76 is high compared to the other resistances, it may, for simplicity, be assumed that the rate at which the condenser 77 discharges is determined by the capacity of the condenser and the magnitude of resistance 76.

As the potential of grid 75 becomes less and less negative with respect to cathode 74, the current flowing through the relay coil 72 from anode 73 to cathode 74 increases and eventually attains a value sufficient to effect closure of contacts 78 and 79 and so cause flow of current through the circuit including resistance 80 and the inter-electrode path between anode 73A and cathode 74. Concurrently with closure of contacts 78 and 79, the contact 41 is moved out of engagement with contact 40 and into engagement with contact 43 to effect reversal of the motor M1 and reverse adjustment of rheostats 29 and 30. As result of flow of the anode current through resistance 80, a direct current difference of potential exists across resistance 80 between cathode 74 and grid 75. The polarity of this potential, which is effective to charge condenser 77, is such that grid 75 gradually, at rate determined by the magnitude of resistance 76 and the capacity of condenser 77, becomes more and more negative with respect to cathode 74. The plate current flowing through coil 72 therefore gradually decreases and finally reaches a magnitude at which it is ineffective to overcome the bias, due to a spring or gravity, tending to cause opening of contact 78 and interruption of flow of current from source 84B through resistance 80. The voltage across 80 therefore disappears and the negative charge on condenser C gradually dissipates, as previously described, and the cycle, above described, is again initiated. Using a resistance 76 of the order of twenty megohms and a capacity 77 of the order of one microfarad, the relay contacts 78, 79, assuming no difference of potential between point 82 and contact 2, are closed for about ten seconds and open for about ten seconds though the duration of the cycle will also depend upon the tube and relay characteristics. By selection or adjustment of resistance 76 and capacity 77, the period of aforesaid cycle may be varied within wide limits. The ratio of the duration of the "closed" interval to the "open" interval will vary as hereinafter explained. Concurrently with movement of contact 78 to open-circuit position, contact 41 is moved out of engagement with contact 43 and into engagement with contact 40 again to reverse the motor M1 and the sense of its adjustment of rheostats 29 and 30.

In addition to resistance 80, the circuit between grid 75 and cathode 74 includes a second source of direct current, the subsidiary network comprising slidewire 1 and resistances 37B, 38B, which produces a voltage whose polarity and magnitude correspond with the sense and extent of displacement of slidewire 1 from the control point.

When the system is installed, rheostat 80 is so manually adjusted that when contact 2 of slidewire 1 is, because of relations hereinafter explained, at the same direct current potential as point 82, the intervals during which contacts 78, 79 of relay 72 are in engagement are equal to the intervals during which these contacts are out of engagement. Under this circumstance, the motor M1 moves slidewires 29 and 30 alternately in opposite directions and to equal extents so that the net result is zero shift of the balance point of the network N2. This reciprocating movement of slidewires 29 and 30 may, if desired, be eliminated by introducing a suitable lost-motion connection in the mechanical coupling 31. In such case, only when successive energizations of the motor armature in opposite sense are unequal is there any adjustment of the resistances 29 and 30.

Preferably, however, the lost-motion connection is so constructed or adjusted the continuous reciprocation of the resistances 29 and 30 though small suffices to nullify any lack of sensitivity in the electrical circuit and so afford control action in response to very small changes in position of slidewire 1.

The direct current for the subsidiary network comprising the slidewire 1 and resistances 37B and 38B may be provided from any suitable source, preferably a rectifier network 83 whose input terminals are connected to the secondary of transformer 84 and whose output terminals are connected to points 26A, 27A of the network.

When slidewire 1 is at the control point, the flow of direct current from the rectifier 83 through the subsidiary bridge does not produce any difference of potential between the grid 75 and the cathode 74. When, however, slidewire 1 is displaced in such sense from the control point that contact 2 is positive with respect to point 82, it opposes the charging voltage across resistance 80 produced by flow of current from source 84B and so increases the interval during which the relay 72 is energized. Conversely, when slidewire 1 is displaced in opposite direction from the control point so that contact 2 is negative with respect to point 82, condenser 77 is charged in shorter time so decreasing the interval during which the relay is energized. The sense and extent to which slidewire 1 is displaced from the control point therefore determines the relative lengths of the intervals during which relay 72 is energized and deenergized, and therefore determines the sense and extent to which the balance point of the main network N2 is shifted by the automatic adjustment of resistances 29 and 30.

The rate of droop correction conveniently may be varied by manual adjustment of rheostat 85 in series with the rectifier 83 and the network N2; adjustment of rheostat 85 in sense increasing the direct current through resistances 37B, 38B and slidewire 1, provides for greater rate of droop correction and, conversely, adjustment of rheostat 85 in sense reducing the flow of direct current through the subsidiary bridge provides for decreased rate of droop correction.

In brief review of the operation of Fig. 4, upon increase or decrease of pressure from the desired magnitude thereof, slidewire 1 is displaced from the control point to unbalance the bridge N2, whereupon the relay R energizes motor M in that direction suited to rebalance the network by adjustment of slidewire 3 and to adjust valve V2 in that sense tending to return the pressure towards the desired or normal magnitude. In addition to this primary control action, so long as the slidewire 1 is displaced from the control point, the subsidiary network comprising resistances 37B and 38B remains unbalanced to effect, by intervention of the relay 72 and its associated tube circuits, energization of motor M1 for rotation alternately in opposite directions and for unequal intervals, by its adjustment of resistances 29 and 30, shifting of the balance point of the network N2 in that direction compensating for the drooping characteristic of the primary control.

Figure 5:
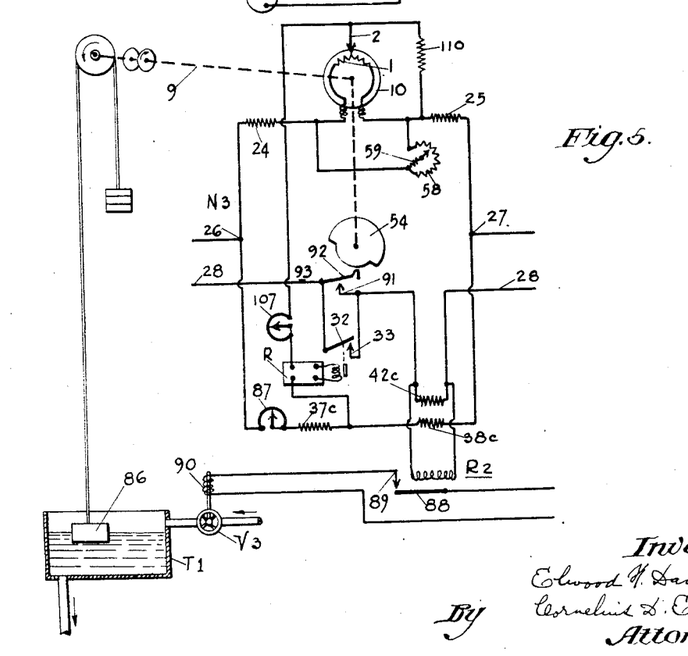
Fig. 5 diagrammatically illustrates a modification utilized for maintaining or controlling the level of a liquid.

The modification of my invention shown in Fig. 5 is illustrated in association with means responsive to the changes in level of liquid in the tank T1 for changing the setting of valve V3 in the supply line to the tank. Those elements corresponding with the elements shown in preceding figures are identified by the same reference characters. It is to be understood the control system is not limited to such use and is suited, by selection of the proper condition-responsive means and final control element, to control conditions other than liquid level.

The float 86, responsive to the changing level in tank T1, is suitably coupled to shaft 9 upon which is mounted slidewire disc 10 and control disc 54. The two lower arms of the bridge N3 comprise a manually adjustable resistance 87, fixed resistance 37C, preferably of nickel or other material having an appreciable temperature coefficient of resistance to afford compensation for changes in ambient temperature, and resistance 38C, also of material having substantial temperature coefficient of resistance. The latter resistance is in intimate heat transfer relation with a heater 42C connected in parallel with the coil of relay R2 whose contacts 88, 89 control the energization of the actuating solenoid 90 of valve V3. Energization of the heater coil 42C and of the operating coil of relay R2 is controlled by two switches, one comprising contacts 32, 33 of relay R and the other comprising contacts 91, 92 of switch 93. With switch 93 open, heating coil 42C and relay R2 may be energized or deenergized by relay R, but with switch 93 closed, heating coil 42C and relay R remain energized regardless of the position of the contact structure of relay R.

The values of the resistances in the arms of the bridge are so chosen that with rheostat 87 set at zero resistance, the bridge is balanced with contact 2 at the control point. By way of example, resistors 37C and 38C may each have a cold resistance of 50 ohms, rheostat 87 a resistance of 25 ohms, resistors 24 and 25 each a resistance of 25 ohms, slidewire 1 a resistance of 100 ohms, and rheostat 58 a resistance of 100 ohms. The switch 93 is so set or positioned with respect to the control disc 54 that it remains closed for all liquid levels below that corresponding with the position of slidewire disc 10 at which contact 2 first engages the central or effective section of the slidewire 1.

The operation of this modification is briefly as follows: It is assumed the manually adjustable droop-correcting resistance 87 is set at its midpoint and that the contact 2 is in engagement with the left-hand end of the effective central section of slidewire 1, with switch 93 open. Under these conditions the bridge is unbalanced and the relay R is energized in that sense effecting engagement of its contacts 32 and 33. Relay R2 is therefore energized to open the valve V3 and to permit flow of liquid to the tank T1 and, at the same time, the heater coil 42C is energized slowly to increase the temperature, and therefore the resistance, of coil 38C and so tend to rebalance the bridge. However, with the control slidewire at the position assumed, the rebalancing action of resistor 38C is insufficient to effect complete balance and therefore the relay R remains energized and valve V3 is continuously open. However, as the level rises in tank T1, the slidewire 1 gradually moves in counterclockwise direction eventually reaching a point at which the new magnitude of resistance of resistor 38C is sufficient to effect balance of the network N3, whereupon relay R responds to deenergize the heating coil 42C, relay R2 and the valve solenoid 90. Deenergization of the heater coil 42C causes the effective magnitude of resistance of resistor 38C gradually to decrease and so unbalance the bridge, again to cause reclosure of the contacts 32, 33 of relay R and so initiate another cycle of the control action.

As the slidewire 1 continues to move toward its right-hand end, less and less resistance is required of coil 38C to rebalance the bridge and consequently relay R effects energization of the heating coil 42C and relay R2 for shorter and shorter intervals. The manually adjustable cycle-setting resistance 107 is provided for predetermining the frequency of aforesaid balancing and unbalancing actions; increase in magnitude of its resistance decreases the effective sensitivity of the relay R and so reduces the frequency of the cyclic balancing and unbalancing.

With high sensitivity, the relay R responds for very slight changes in temperature of resistance 38C and consequently operates frequently. With less sensitivity of relay R, a greater change in temperature of coil 38C is required and consequently the cycle is of longer duration. The resistance 107 may preferably so be set that the successive energizations of relay R2 are sufficiently close together to avoid appreciably large oscillation of the magnitude of the controlled condition; for example, the level of liquid in tank T1. This system is well adapted to control the temperature of an electric furnace; the heating element of the furnace is substituted in circuit for the solenoid 90, and the slidewire disc 10 is automatically positioned in accordance with the furnace temperature, generally as in Fig. 1, and modifications subsequently described.

In so controlling the supply of current to an electric furnace, the droop corrector rheostat 87 is manually set to balance the heat input to the heat demand so that the temperature remains substantially constant at the desired control point. With the droop corrector dial set at zero resistance, the resistances of coils 37C and 38C are, as above stated, nominally equal, and consequently, with the temperature at the control point, no heat input is necessary. With the droop corrector set at maximum, assuming the values above given the resistance of coil 38C must be 50 per cent higher than the resistance of 37C to rebalance the bridge at the control point. The heating coil 42C is preferably so designed that for such maximum setting of the droop corrector it must be energized continuously to maintain the temperature constant at the control point; therefore, for any demand within the capacity of the furnace, there is a corresponding setting of the droop-corrector resistance 87 which provides for such control of the furnace input that its temperature is maintained at the control point.

Figure 6:
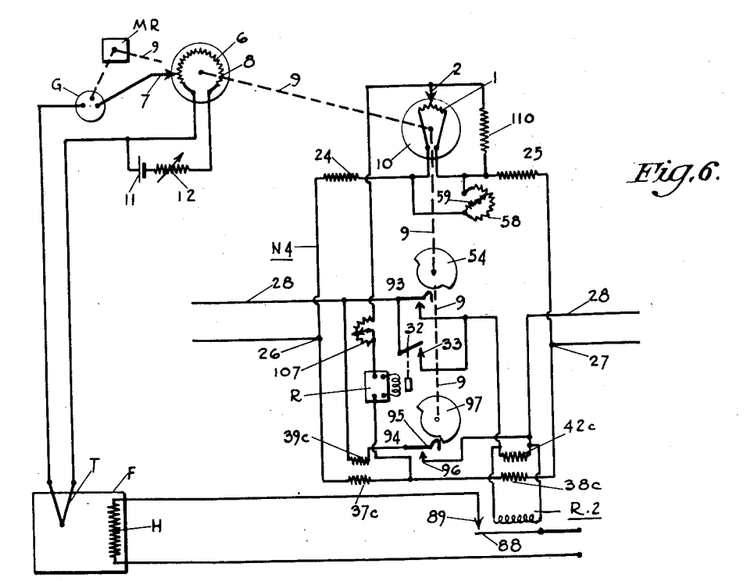
Figs. 6 to 9 inclusive diagrammatically illustrate further modifications of the invention utilized for controlling the temperature of electric furnaces.

In the modification shown in Fig. 6, the rate or proportioning action is the same as that of Fig. 5. In this modification, however, the manually adjustable droop corrector resistor 87 is omitted and the resistance 37C is wound upon the same form as heater winding 39C to provide for automatic droop correction. The form may, for example, be a thick copper rod having such mass that the temperature of resistance 37C changes at very slow rate, much less than the rate at which the temperature of resistance 38C changes.

The switch 94 comprising contacts 95, 96 is actuated by a second control disc 97 so constructed and disposed upon shaft 9 that switch 94 remains closed for all magnitudes of the furnace temperature less than the desired magnitude. Therefore when the furnace temperature is subnormal, the temperature of the assembly comprising heater 39C, coil 37C, and their common form is gradually increased, whereas when the furnace temperature, in rising, passes above the control point, the switch 94 is opened to allow the assembly gradually to cool.

With the slidewire 1 in its midposition, which represents or corresponds to the control point, the resistance of coil 38C must equal that of coil 37C to balance the bridge. Therefore, the heat input to the furnace will, because of the automatic droop-corrective action, either gradually increase or decrease, depending upon whether the temperature is above or below the control point, with result the temperature is maintained, within narrow limits, at the control point regardless of the changes in load or heat demand. This feature is of practical value not only in holding proper temperature regardless of variations in line voltage, ambient temperature, amount of work in the furnace and other variables, all termed for purpose of brevity herein as load or heat demand, but also in producing a control action such that in batch processes the desired temperature is more quickly reached without overshooting.

Figure 7:
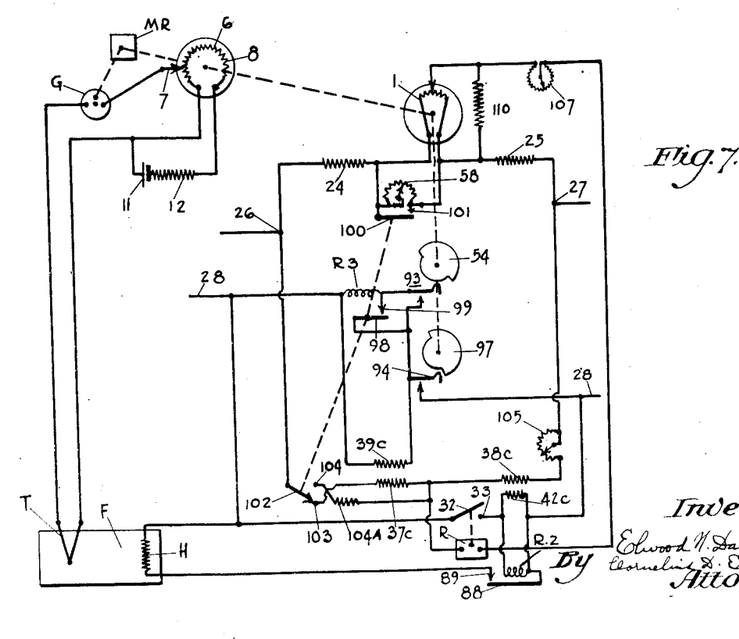

The modification shown in Fig. 7 has the additional feature which, in conjunction with the automatic droop correction of Fig. 6, permits adjustment of the maximum heat-input rate while the furnace temperature is rising to the control point, as well as thereafter.

In this modification, the energization of the heating coil of heater 42C and relay R2 is subject to control only by relay R and there is provided an additional relay R3 whose operating coil is in series with the switches 93 and 94. Contacts 98, 99 of relay R3 provide a lock-in path in shunt to the contacts of switch 93. When the relay R3 is energized, its contacts 100, 101 are closed to shunt or short-circuit the slidewire 1, its contacts 98, 99 are closed to complete its lock-in circuit, and its contact 102 is in engagement with contact 104 to exclude the resistance 37C from the bridge circuit and to substitute for it the resistor 104A whose resistance is equal to the sum of the cold resistance of resistor 38C and the maximum resistance of the rate-setting rheostat 105. With relay R3 deenergized, the slidewire 1 is unshunted by contacts 100, 101, the contacts 99, 98 are out of engagement with each other, and contact 102 is in engagement with contact 103 to substitute the coil 37C for the coil 104A.

When the temperature of the furnace F is below the magnitude corresponding with the low end of the slidewire 1, the relay R3 is energized. Under these conditions, the percentage heat input to the furnace is determined by the setting of the rheostat 105; for example, if the rheostat 105 is set at mid-position, the relay R2 under control of relay R is open half of the time and closed half of the time because the successive balancing and unbalancing periods of the network are equal in duration. When the temperature has risen to the control point, the relay R3 is deenergized by opening of switch 94 and the subsequent control action is the same as described above in connection with Fig. 6. The deenergization of relay R3 also connects the resistance 37C in circuit to afford the automatic droop correction above described in connection with Fig. 6, modified, however, in that the maximum input is limited by the setting of rheostat 105.

Figure 8:
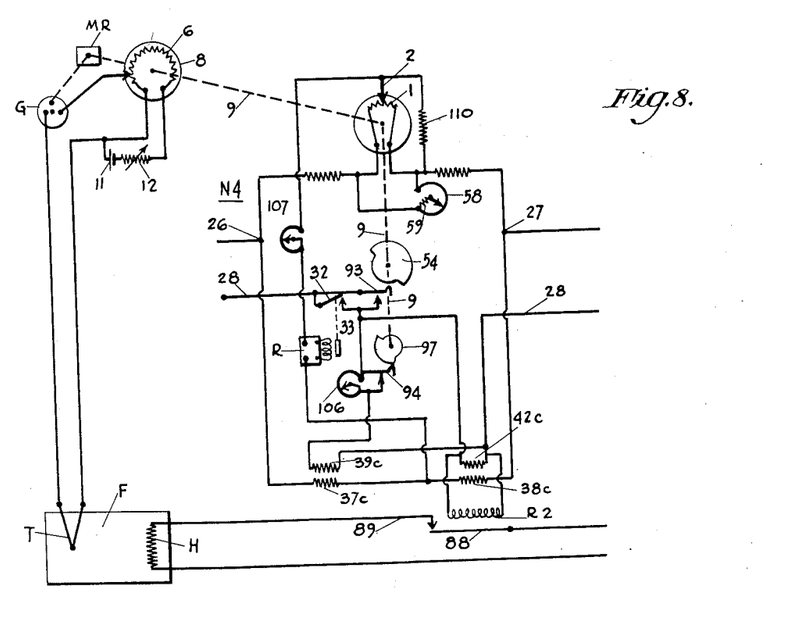
Figure 9:
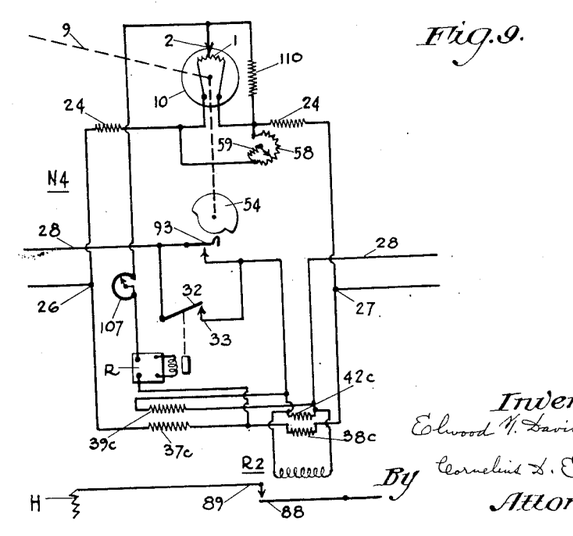

Except for the differences specifically discussed, the modifications shown in Figs. 8 and 9 are similar to that of Fig. 6. As heretofore, elements having the same function in the different figures are identified by the same reference characters.

Referring to Figs. 8 and 9, it is assumed the temperature has just fallen from the control point and that the resistances of the coils 37C, 38C are at this time equal. The displacement of slidewire 1 from the control point in response to such fall in temperature unbalances the network or bridge, causing relay R to effect closure of its contacts 32 and 33, so to cause energization of the operating coil of relay R2 to close the circuit of the heater H of the furnace. The closure of contacts 32 and 33 also energizes the heating coils 39C and 42C associated, respectively, with aforesaid resistances 37C and 38C. The assemblies, one comprising heater 39C and resistance 37C, and the other comprising heater 42C and resistance 38C, are so constructed that a given heat input produces the same ultimate temperature rise and same ultimate resistance of the two resistors 37C, 38C. However, the heater 42C and coil 38C are wound on a form having less thermal inertia or heat storage capacity than the assembly comprising heater 39C and resistance 37C.

With contacts 32 and 33 of relay R remaining closed, when the temperature differential between the two resistances 37C, 38C has attained that value required to rebalance the bridge with slidewire 1 in its displaced position, the relay R responds to open its contacts 32, 33, whereupon both assemblies begin to cool but at different rates. When, because of resulting change in the ratio of the resistances of resistors 37C and 38C, the bridge again is sufficiently unbalanced, relay R again effects reclosure of its contacts 32 and 33 to reenergize the two heating coils 39C, 42C and the heating element H of the furnace. This repeated balancing and unbalancing of the bridge, and intermittent supply of current to the furnace, proceed until slidewire 1 is returned to the control point by rise of the furnace temperature to the desired magnitude thereof.

Because of aforesaid difference in the thermal characteristics of the two assemblies 37C, 39C and 38C, 42C, the heating effect produced by heater 39C upon droop-correcting resistor 37C must, assuming the controlled temperature is rising to the control point, be greater in each succeeding impulse than the one preceding it, in order to produce that temperature difference between coils 37C and 38C, required to balance the network for a given deviation of the slidewire from the control point; conversely when the temperature is falling to the control point, the heating effect produced by 39C upon resistor 37C is less and less in each succeeding impulse to produce that temperature difference between coils 37C and 38C required to balance the network.

With the temperature at the control point, the average power input to the furnace will remain the same at whatever level it happens to be when the furnace temperature arrives at the control point since, at that time, the heating effects upon resistances 37C and 38C by the associated heating coils are such that the effective magnitudes of resistances 37C, 38C are equal.

The rate of droop corrector action may, in both Figs. 8 and 9, be varied by adjustment of the throttling range rheostat 58 connected in shunt to the slidewire 1. The rate of droop corrector action also may be varied by changing the thermal characteristics of the assembly, including resistance 37C and its heater 39C; as previously stated, these two coils 37C, 39C may be wound on a hollow tubular form with provision for insertion of additional tubes of various wall thicknesses to procure the desired thermal lag or capacity of the droop-corrector assembly.

The modification shown in Fig. 8 has, in addition, a supplemental control disc 97 and switch 94 which especially adapts the control system to batch type furnaces and prevents initial overshooting of the control point when the load first arrives at the desired temperature.

The switch 94 which, when closed, shunts or short-circuits the rheostat 106, is so set with respect to control disc 97 on shaft 9 that it remains open until the temperature in rising almost reaches the desired temperature. Consequently, after a charge is placed in the furnace, its temperature is raised at maximum rate by continuous energization of heater H, until the switch 93 is opened by the control disc 54. The relay R then assumes control of the heating coils 39C and 42C and of the relay R2. The control system thereupon tends to establish a temperature higher than the setting of switch 94 and so avoids overshooting of the temperature beyond the desired temperature. When switch 94 is closed by control disc 97, the rheostat 106 is short-circuited so to increase the rate of heating of resistance 37C by coil 39C. Further control action for maintenance of the furnace temperature at its desired magnitude is then the same as that above described as common to the modifications shown in Figs. 8 and 9.

The resistance 110 shown in these and preceding modifications is to prevent interruption of the branch circuit including relay R when contact 2 rides off one or the other of the ends of resistance 1.

What I claim is:

1. A system for controlling the application of an agent affecting the magnitude of a condition comprising a balanceable network including a variable impedance whose adjustable element is displaced from a control point in sense and to extent corresponding with the sense and extent of the deviation from the desired magnitude of said condition, means external to said network energizable to vary the ratio of the magnitudes of other impedances of the network, control means energizable to vary the application of said agent, and means for controlling the energization of said control means and of said ratio-varying means comprising circuit-controlling devices whose circuit-controlling actions depend upon unbalance of said network and, independently of distribution of current in said network, upon displacement of said element from said control point.

2. A system for controlling the application of an agent affecting the magnitude of a condition comprising a balanceable network including a variable impedance whose adjustable element is displaced from a control point in sense and to extent corresponding with the sense and extent of the deviation from the desired magnitude of said condition, heating means external to said network for varying the ratio of the magnitudes of other impedances of said network, control means energizable to vary the application of said agent, and means for controlling the energization of said control means and of said heating means comprising circuit-controlling devices whose circuit-controlling actions depend upon unbalance of said network and, independently of distribution of current in said network, upon displacement of said element from said control point.

3. A system for controlling the application of an agent affecting the magnitude of a condition comprising a balanceable network including a variable impedance whose adjustable element is displaced from a control point in sense and to extent corresponding with the sense and extent of the deviation from the desired magnitude of said condition, heating coils external to said network for varying the effective magnitudes of other impedances of said network, control means energizable to vary the application of said agent, and means for controlling the energization and de-energization of said control means and the energization and de-energization of said heating coils comprising circuit-controlling devices whose circuit-controlling positions depend upon unbalance of said network and, independently of distribution of current in said network, upon displacement of said element from said control point.

4. A system for controlling the application of an agent affecting the magnitude of a condition comprising a balanceable network including a variable impedance whose adjustable element is displaced from a control point in sense and to extent corresponding with the sense and extent of the deviation from the desired magnitude of said condition, control means energizable to vary the application of said agent and to effect rebalancing adjustment of said network, means responsive to unbalance of said network for controlling the energization of said control means, and means for preventing said network from remaining in balance so long as said element is displaced from said control point comprising heating means external to said network for varying the ratio of the magnitudes of other impedances of said network, and means effective for a portion of the range of displacement of said element to cause energization of said heating means, independently of distribution of current in said network.

5. A system for controlling the application of an agent affecting the magnitude of a condition comprising two independently balanceable bridges having in at least one arm concurrently common to the bridges a variable impedance whose adjustable element is displaced from a control point in sense and to extent corresponding with the sense and extent of the deviation from the desired magnitude of said condition, means responsive to unbalance of one of said bridges for varying the application of said agent, and means responsive to unbalance of the other of said bridges effective to shift the balance point of said one of said bridges.

6. A system for controlling the application of an agent affecting the magnitude of a condition comprising two independently balanceable bridges having in at least one arm common to the bridges a variable impedance whose adjustable element is displaced from a control point in sense and to extent corresponding with the sense and extent of the deviation from the desired magnitude of said condition, means responsive to unbalance of one of said bridges for varying the application of said agent, impedance means adjustable to shift the balance point of said one of said bridges, a reversible motor for actuating said adjustable impedance means, and means responsive to unbalance of the other of said bridges for energizing said motor in accordance with the sense of unbalance thereof to effect adjustment of said impedance means.

7. A system for controlling the application of an agent affecting the magnitude of a condition comprising two independently balanceable bridges having in at least one arm common to the bridges a variable impedance whose adjustable element is displaced from a control point in sense and to extent corresponding with the sense and extent of the deviation from the desired magnitude of said condition, means responsive to unbalance of one of said bridges for varying the application of said agent, impedance means adjustable to shift the balance point of said one of said bridges, a reversible motor for actuating said adjustable impedance means, and means effective so long as said element is displaced from said control point to cause operation of said motor alternately in opposite directions for unequal intervals, the inequality of successive intervals depending upon the sense and extent of the displacement of said element from said control point.

8. A system for controlling the application of an agent affecting the magnitude of a condition comprising two independently balanceable bridges having in at least one arm common to the bridges a variable impedance whose adjustable element is displaced from a control point in sense and to extent corresponding with the sense and extent of the deviation from the desired magnitude of said condition, means responsive to unbalance of one of said bridges for varying the application of said agent, and means including means responsive to unbalance of the other of said bridges for oscillating the balance point of said one of said bridges with decreasing net effect upon shift of the balance point as said element approaches the control point.

9. A system for controlling the application of an agent affecting the magnitude of a condition comprising two independently balanceable bridges having in at least one arm concurrently common to the bridges a variable impedance whose adjustable element is displaced from a control point in sense and to extent corresponding with the sense and extent of the deviation from the desired magnitude of said condition, a single source for supplying current to said bridges, means responsive to unbalance of one of said bridges for varying the application of said agent, and means responsive to unbalance of the other of said bridges effective to shift the balance point of said one of said bridges.

10. A system for controlling the application of an agent affecting the magnitude of a condition comprising two independently balanceable bridges having in at least one arm common to the bridges a variable impedance whose adjustable element is displaced from a control point in sense and to extent corresponding with the sense and extent of the deviation from the desired magnitude of said condition, means responsive to unbalance of one of said bridges for varying the application of said agent and effecting rebalancing adjustment of said one of the bridges, and means responsive to unbalance of the other of said bridges slowly to effect both its own rebalance and an unbalance of said one of said bridges.

11. A system for controlling the application of an agent affecting the magnitude of a condition comprising two independently balanceable bridges having in at least one arm common to the bridges a variable impedance whose adjustable element is displaced from a control point in sense and to extent corresponding with the sense and extent of the deviation from the desired magnitude of said condition, means energizable to vary the application of said agent and to effect rebalancing adjustment of one of said bridges, means responsive to unbalance of said one of said bridges to control the energization of said energizable means, impedance means adjustable to shift the balance point of said one of said bridges, means energizable to effect adjustment of said impedance means, heating means for slowly shifting the balance point of the other of said bridges, and means responsive to unbalance of said other of said bridges to control energization of said heating means and of said last-named energizable means.

12. A system for controlling the application of an agent affecting the magnitude of a condition comprising a balanceable network including a variable impedance whose adjustable element is displaced from a control point in sense and to extent corresponding with the sense and extent of deviation of the magnitude of said condition from the desired magnitude, control means for varying the application of said agent, devices energizable slowly to vary the effective magnitudes of other impedances of said network, means responsive to unbalance of said network to effect energization of said control means and of one of said devices to vary the effective magnitude of one of said other impedances in sense to restore balance of said network, and means effective for part of the range of displacement of said element for effecting energization of another of said devices to vary the effective magnitude of another of said other impedances in sense to unbalance said network.

13. A system for controlling the application of an agent affecting the magnitude of a condition comprising a balanceable network including a variable impedance whose adjustable element is displaced from a control point in sense and to extent corresponding with the sense and extent of deviation of the magnitude of said condition from the desired magnitude, control means energizable to vary the application of said agent, devices energizable slowly to vary the effective magnitudes of other impedances of said network, means responsive to one sense of unbalance of said network to effect energization of said control means and of one of said devices to vary the effective magnitude of one of said other impedances in sense tending to restore balance of said network, means effective to energize said one of said devices for a portion of the range of displacement of said element, and means effective for another portion of said range of displacement overlapping said first-named portion thereof to energize another of said devices so to vary the effective magnitude of another of said other impedances in sense tending to effect unbalance of said network.

14. A system for controlling the application of an agent affecting the magnitude of a condition comprising a balanceable network including a variable impedance whose adjustable element is displaced from a control point in sense and to extent corresponding with the sense and extent of deviation of the magnitude of said condition from a desired magnitude, control means energizable to vary the application of said agent, devices energizable slowly to vary at different rates the effective magnitudes of other impedances of said network, means responsive to unbalance of said network to effect energization of said control means and of one of said devices slowly to vary the effective magnitude of one of said other impedances in a sense tending to effect rebalance of said network, means effective to energize said one of said devices for a portion of the range of displacement of said element, and means effective for another portion of said range of displacement to energize another of said devices more slowly to vary the effective magnitude of another of said other impedances in a sense tending to unbalance said network.

15. A system for controlling the application of an agent affecting the magnitude of a condition comprising a balanceable network including a variable impedance whose adjustable element is displaced from a control point in sense and to extent corresponding with the sense and extent of the deviation from the desired magnitude of said condition, control means for varying the application of an agent affecting the magnitude of said condition, devices energizable slowly to vary the effective magnitude of other impedances of said network, means responsive to unbalance of said network to effect energization of said control means and of one of said devices to vary the magnitude of one of said other impedances in sense to restore balance of said network, and means for controlling energization of another of said devices to vary the magnitude of another of said other impedances in sense unbalancing said network comprising said responsive means and means effective within part of the range of displacement of said element.

16. A system for controlling the application of an agent affecting the magnitude of a condition comprising a variable impedance whose adjustable element is displaced from a control point in sense and to extent corresponding with the sense and extent of the deviation from the desired magnitude of said condition, control means for varying the application of an agent affecting the magnitude of said condition, a pair of devices energizable slowly to vary the effective magnitudes of other impedances of said network, means alone effective for a portion of the range of displacement of said element from said control point for concurrently energizing said devices, means responsive to unbalance of said network and alone effective for another portion of said range to control energization of said devices, and means which for another portion of said range is jointly effective with said responsive means to control energization of one of said devices.

17. A system for controlling the application of an agent affecting the magnitude of a condition comprising a balanceable network including a variable impedance whose adjustable element is displaced from a control point in sense and to extent corresponding with the sense and extent of deviation of the magnitude of said condition from the desired magnitude, heating coils for affecting the effective magnitudes of other impedances of said network, control means for varying the application of said agent, means for controlling the energization of said control means and one of said heating coils comprising means responsive to unbalance of said network and means effective for a portion of the range of displacement of said element, and means for controlling the energization of another of said heating coils effective for another portion of said range of displacement.

18. A control system comprising a balanceable network including a variable impedance having an element adjusted in response to changes in magnitude of the condition to be controlled, heating coils for varying the effective magnitudes of other impedances of said network, control means for varying the application of an agent affecting the magnitude of said condition, means for controlling the energization of said control means and one of said heating coils comprising means responsive to unbalance of the network and means operative within part of the range of adjustment of said element, and means for controlling the energization of another of said heating coils comprising means responsive within another part of said range of adjustment.

19. A control system comprising a balanceable network including an impedance adjusted in response to changes in magnitude of the condition to be controlled, heating coils for varying the magnitudes of other impedances of said network, control means for varying the application of an agent affecting the magnitude of said condition energized concurrently with one of said heating coils, means responsive to unbalance of said network for controlling the energization of at least said one of said heating coils, means operative within part of the range of adjustment of said first impedance to maintain energization of said one of said heating coils independently of said responsive means, and means operative within part of the range of adjustment of said first impedance to maintain energization of another of said heating coils independently of said responsive means.

20. A control system comprising a balanceable network including a variable impedance having an element adjusted in response to changes in magnitude of the condition to be controlled, heaters energizable to vary at different rates the effective magnitudes of other impedances of said network, control means for varying the application of an agent affecting the magnitude of said condition, means responsive to unbalance of said network operative for part of the range of adjustment of said element to control the energization of said heaters and of said control means, and means operative to control the energization of said heaters and of said control means for another part of the range of adjustment of said element in dependence upon the position of said element and independently of unbalance of said network.

21. A control system comprising a balanceable network including a variable impedance having an element adjusted in response to changes in magnitude of a condition to vary the ratio of two arms of said network, heaters for varying at different rates the effective magnitudes of two other arms of said network, control means for varying the application of an agent affecting said condition, means responsive to unbalance of said network for part of the range of adjustment of said element to control the energization of said heaters and of said control means, and means operated in dependence upon the position of said element irrespective of unbalance of said network for control of the energization of said heaters and of said control means.

22. A control system comprising a balanceable network including an impedance adjusted in response to changes in magnitude of a condition, an electric heater energizable to vary the effective magnitude of another impedance of said network, circuit-controlling means responsive to unbalance of said network for controlling energization of said heater, and impedance means adjustable to select the rate of change of the effective magnitude of said other impedance which occurs upon energization of said heater.

23. A control system comprising a balanceable network including an impedance having an element adjusted in response to changes in magnitude of a condition, an electric heater energizable to vary the effective magnitude of another impedance of said network, circuit-controlling means responsive to unbalance of said network for controlling energization of said heater, and means adjusted in unison with said element to vary the rate at which the effective magnitude of said other impedance is changed upon energization of said heater.

24. A system for controlling the application of an agent affecting the magnitude of a condition comprising a balanceable network including a branch which at balance is traversed by null current, a variable impedance included in said network having an adjustable element displaced from a control point in sense and to an extent corresponding with the sense and extent of the deviation from the desired magnitude of said condition, means external to said network energizable to vary the ratio of the magnitudes of other impedances of said network, control means energizable to vary the application of said agent, and means for controlling the energization of said control means and of said ratio-varying means comprising circuit-controlling devices having their contacts external to said network, the contact-positions of one of which depends upon the drop of potential across said branch of the network and of another of which, independently of the distribution of current in said network, depends upon the displacement of said element from said control point.

25. A system for controlling the application of an agent affecting the magnitude of a condition comprising a network including two bridge circuits concurrently adjusted by a movable element whose displacement from a control point corresponds in sense and to extent with the deviation from the desired magnitude of said condition, means responsive to unbalance of one of said bridge circuits for varying the application of said agent and effecting rebalancing adjustment of said one of said bridges, and means responsive to unbalance of the other of said bridges slowly to effect both its own rebalance and an unbalance of said one of said bridge.

ELWOOD T. DAVIS.